No. 631,566. Patented Aug. 22, 1899.
F. FERRACCIU.
APPARATUS FOR GENERATING ACETYLENE GAS.
(Application filed May 1, 1897.)
(No Model.)
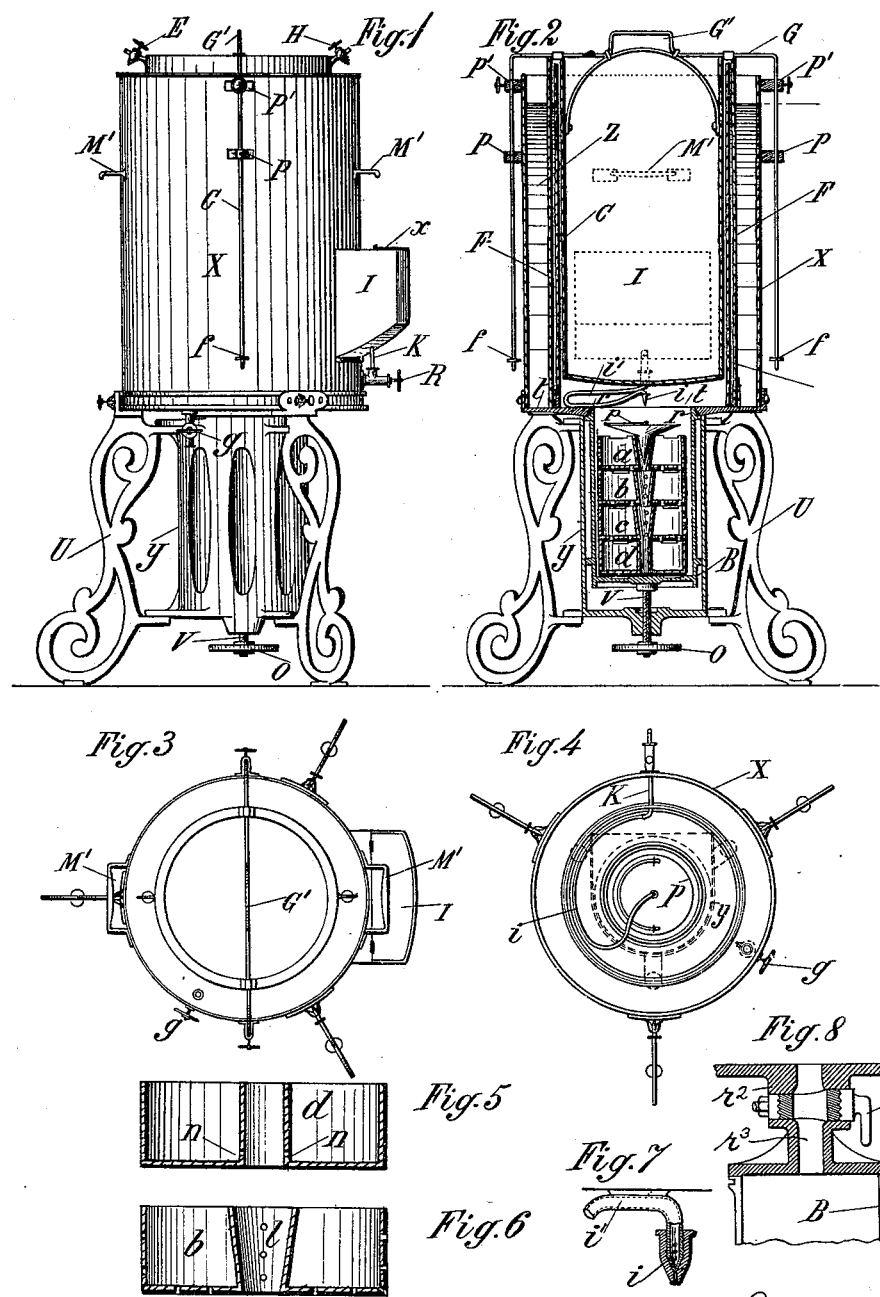

UNITED STATES PATENT OFFICE.

FILIBERTO FERRACCIU, OF SAVONA, ITALY.

APPARATUS FOR GENERATING ACETYLENE GAS.

SPECIFICATION forming part of Letters Patent No. 631,566, dated August 22, 1899.

Application filed May 1, 1897. Serial No. 634,774. (No model.)

*To all whom it may concern:*

Be it known that I, FILIBERTO FERRACCIU, commander in the Italian navy, a subject of the King of Italy, residing at Savona, in the Kingdom of Italy, have invented new and useful Improvements in Apparatus for the Production of Acetylene Gas, (for which Letters Patent have been obtained in Italy, dated November 15, 1896, Reg. At., Vol. LXXXIV, No. 50;) and I do declare the following to be a full, clear, and exact description of the invention, such as will enable others skilled in the art to which it appertains to make and use the same.

My invention has relation to apparatus for generating acetylene gas, and among the objects in view is to provide an apparatus of this character which will be simple and inexpensive in construction, efficient in operation, and which will automatically control the generation of gas according to the amount to be burned.

The invention consists in the novel construction, arrangement, and combination of parts, as hereinafter fully described, illustrated in the drawings, and pointed out in the appended claims.

In the drawings, Figure 1 is a front elevation of the apparatus. Fig. 2 is a vertical sectional view of same. Fig. 3 is a plan view. Fig. 4 is a horizontal section of the apparatus on line M N of Fig. 2. Fig. 5 is a vertical section of the lower carbid-receptacle. Fig. 6 is a vertical section of an intermediate receptacle $b$. Fig. 7 is a sectional elevation of the water-regulating cock $i$. Fig. 8 is a vertical section of the gasometer-bottom provided with a cock serving to interrupt or to open the communication between the gasometer and the carbid-holder.

In the above-described drawings, X indicates a gasometer, and C a float, said gasometer being suitably secured to a tripod or other suitable support U, of iron or other material. The gasometer is provided with handles M' for facilitating transportation of same. The carbid holder or reservoir B is carried by the support U, but is removable therefrom in the manner presently described. The bottom of the gasometer is provided with a central opening, within which the upper end of the holder B is arranged and held therein by means of a screw-rod V, operated by a hand-wheel O. This holder is made of cast-iron of the shape shown and provided with a suitable handle on each side. The upper portion has a flange-shaped projection $b'$ and an edge or lip $r$, both adapted to make a tight joint with the edge of the opening in the bottom of the reservoir or gasometer X, and a rubber gasket is in practice to be interposed between the adjacent parts to insure a tight joint.

The holder B contains four loosely-superposed cast-iron receptacles $a\ b\ c\ d$, Fig. 2, three of the same being perforated at sides and bottom. The receptacle $b$ is provided with a central conical tube $l$, Fig. 6, which terminates on a level with the upper edge of the receptacle. Receptacle $c$ is similar in construction to receptacle $b$. The receptacle $d$ has no perforations, but is provided with a central cylindrical tube partly screw-threaded interiorly and adapted to receive a suitable handle. The tube of receptacle $d$ has two holes $n$ adjacent to the bottom. Within the upper receptacle $a$ is placed a funnel $p$, made of zinc, through which the water issuing through cock $i$ is led into the lower receptacles.

On the outer side of the gasometer X is placed at a suitable point a water-receptacle or basin I, provided with a hinged cover $x$, said basin having an outlet-tube K and cock R at the bottom. This outlet-tube passes through the partitions of the gasometer and is bent at a right angle parallel to the bottom of the gasometer.

The float C is composed of a cylindrical bucket-shaped receptacle having double walls, an inner one, C', and an outer one, F, Fig. 2. At the bottom of the inner wall C' is soldered a cock $i$, which is connected through a rubber tube $i'$ to the basin I. Cock $i$ is so arranged that the supply of water may be regulated. The float C performs the function of filling out the empty space inside of the gasometer, so that the latter will contain as little air as possible. Two cocks E and H are provided at the upper portion of the float. At right angles to the connecting-line between these two cocks is arranged a metal bail or strap G, having a bent portion G', forming a handle, the arms of the bail passing through four ears or perforated lugs attached to said gasometer, the upper pair P' being provided with clamping-screws to secure the attachment of the float to the gasometer, if this be desired. The arms of the bail are screw-threaded at $f$ to receive nuts which serve as stops to limit the upward movement of the float.

$y$ is a casing within which the carbid-holder B is arranged, said casing $y$ being bolted to the support U and being of the shape and open at the side, as seen in dotted lines, Fig. 4, to adapt the holder B to be readily removed laterally from said casing when desired.

From the following the operation of the apparatus will be understood: Supposing the carbid-holder B to have been removed, the screws P' loosened from the arms of the bail, the various cocks closed, and the cock E placed in communication with the burner, which is to be lighted by means of a flexible tube, the space Z is now filled with water up to the level S, which causes the float C to rise slightly, due to the compression of the air within same, but which will gradually fall back when compressed air is let out through cock H. The cock H may be opened before the filling of the device with water, as just described, but it is preferable to open it after such operation for the reason that the compressed air will indicate whether the float is air-tight. After the pouring in of the water the four receptacles $a\ b\ c\ d$ are filled with carbid and are placed in the holder B in the order indicated in Fig. 2. The holder is now placed in position in the casing $y$ and pressed firmly against the bottom $t$ of the gasometer by turning the wheel O and screw-rod V. The basin I is then filled with water up to the desired level and cock R is opened, when the water of the basin I will flow through the tube $i'$ and cock $i$, through funnel $p$, placed in receptacle $a$, and passing down to the lower receptacle $d$ and the carbid contained therein, so that the production of acetylene in each receptacle is from bottom to top, the water rising from one receptacle to the one next above it. The float and the cock $i$ rise as the gas is developed, and when the cock reaches a level above that of the water in basin I the water will automatically stop flowing into the carbid-receptacles. In case there should be a rapid development of gas, the float rising so quickly that the gas escapes from the bottom, the screw-nuts $f$, attached to the bail, will strike against the lugs P and limit the upward movement of the float. When gas is being produced and the float rises to the point P or below, the gas may be turned on by cock E and lighted at the burner. It will be advisable the first time the apparatus is used to let the compressed air in the same escape by opening cocks E and H for several seconds before lighting. When the gas has been lighted and is being slowly consumed, the float gradually sinks, by which operation more water flows into the carbid-receptacles and more gas is developed, which causes the float to again rise, which operation is repeated without the aid of an attendant until all carbid is exhausted. In the event that it is desired to let the water contained in the gasometer flow off for some reason or other cock $g$ may be opened for the purpose.

Practice has shown that the apparatus works for more hours than it is calculated for, and in such case the bottom of the gasometer X may be constructed, as seen in Fig. 8—that is to say, having a depending portion $r^2$ upon its under side which is provided with a passage or bore $r^3$ and the holder B being adapted to seat against said portion $r^2$, as shown—with a small opening. A cock $r^0$, Fig. 8, is arranged to control the passage of gas through the bore or passage $r^3$, so that if the apparatus is still full of gas the cock $r^0$ need only be closed, and the communication between the gasometer and holder B and carbid-receptacles therein being cut off the receptacles can then be refilled and cock $r^0$ again opened.

What I claim, and desire to secure by Letters Patent, is—

1. In an apparatus of the character described, the combination with a fixed gasometer having an opening in its bottom, of a float adapted to rise and fall in the gasometer, a water-receptacle carried by the gasometer, a carbid-holder secured below the gasometer over the opening in the bottom thereof, a carbid-receptacle carried within the holder a flexible tube connected with the water-receptacle and adapted to supply water to the carbid-receptacle, a cock adapted to control the flow of water through the tube in the manner, and for the purpose specified.

2. In an apparatus of the character described, the combination with a fixed gasometer having an opening in its bottom, of a float adapted to rise and fall within the gasometer, a water-receptacle carried by the gasometer, a carbid-holder secured below the gasometer and over the opening therein, a carbid-receptacle carried within the holder, a flexible tube connected with the water-receptacle and adapted to supply water through the opening in the bottom of the gasometer to the carbid-receptacle, a cock arranged to control the flow of water through the opening, a second cock on the float adapted to rise and fall therewith to control the flow of water through the flexible tube, all as described and for the purpose specified.

3. In an apparatus of the character described, the combination with a fixed gasometer, of a float adapted to rise and fall therein, said gasometer having an opening in its bottom, a water-receptacle carried by the gasometer, a carbid-holder, means for detachably securing the latter over the opening in the bottom of the gasometer, a carbid-receptacle within the holder, a flexible tube connected with said water-receptacle adapted to supply water to the carbid-receptacle, and a cock carried by the float and adapted to
5 control the flow of water through the flexible tube when the float rises and falls in the manner described.

In testimony whereof I have affixed my signature in the presence of two witnesses.

FILIBERTO FERRACCIU.

Witnesses:
G. B. ZANARD, Jr.,
ROBERT B. HANDLEY.